(12) United States Patent
Peterson

(10) Patent No.: US 8,371,065 B2
(45) Date of Patent: Feb. 12, 2013

(54) ROOT WATERING SYSTEM AND METHOD THEREFOR

(75) Inventor: Gerald E. Peterson, Riverside, CA (US)

(73) Assignee: Rain Bird Corporation, Azusa, CA (US)

( * ) Notice: Subject to any disclaimer, the term of this patent is extended or adjusted under 35 U.S.C. 154(b) by 303 days.

(21) Appl. No.: 11/833,706

(22) Filed: Aug. 3, 2007

(65) Prior Publication Data

US 2009/0031626 A1 Feb. 5, 2009

(51) Int. Cl.
*A01G 29/00* (2006.01)
(52) U.S. Cl. .......................................................... 47/48.5
(58) Field of Classification Search .................. 47/48.5, 47/59 R, 59 S, 63, 64, 79–82; 405/43, 44, 405/45; 239/200, 201
See application file for complete search history.

(56) References Cited

U.S. PATENT DOCUMENTS

| | | | |
|---|---|---|---|
| 419,242 A * | 1/1890 | Brown | 47/48.5 |
| 3,333,773 A * | 8/1967 | Hutchinson | 239/289 |
| 3,755,966 A | 9/1973 | Smith | |
| 4,153,380 A | 5/1979 | Hartman | |
| 4,578,897 A | 4/1986 | Pazar et al. | |
| 4,685,827 A | 8/1987 | Sibbel | |
| 4,697,952 A | 10/1987 | Maddock | |
| 4,726,143 A | 2/1988 | Steinbeck | |
| 4,739,789 A * | 4/1988 | Hamilton | 137/78.2 |
| 4,765,541 A | 8/1988 | Mangels | |
| 5,097,626 A | 3/1992 | Mordoch | |
| 5,294,212 A | 3/1994 | Mehoudar | |
| 5,761,846 A | 6/1998 | Marz | |
| RE35,857 E | 7/1998 | Mehoudar | |
| 5,795,100 A | 8/1998 | Thomas et al. | |
| 5,809,692 A | 9/1998 | Kesler | |
| 5,924,240 A | 7/1999 | Harrison | |
| 5,956,899 A | 9/1999 | DiOrio | |
| 5,975,797 A | 11/1999 | Thomas et al. | |
| 5,996,279 A | 12/1999 | Zaueratabat | |
| 6,161,776 A | 12/2000 | Byles | |
| 6,540,436 B2 | 4/2003 | Ogi | |
| 6,984,090 B2 | 1/2006 | Allen | |
| 7,059,367 B2 | 6/2006 | Atkinson | |
| D524,611 S | 7/2006 | Liu et al. | |
| D527,439 S | 8/2006 | Liu et al. | |
| D527,791 S | 9/2006 | Onofrio et al. | |
| 7,707,770 B2 | 5/2010 | Liu | |
| 8,065,832 B2 | 11/2011 | King | |
| 2004/0074997 A1* | 4/2004 | Sacks | 239/542 |
| 2004/0108391 A1 | 6/2004 | Onofrio | |
| 2004/0195360 A1 | 10/2004 | Walker | |
| 2005/0040256 A1 | 2/2005 | Santos | |
| 2005/0274071 A1 | 12/2005 | Allen | |
| 2006/0112626 A1 | 6/2006 | Liu et al. | |
| 2008/0025796 A1 | 1/2008 | Allen | |
| 2011/0056128 A1 | 3/2011 | King | |

FOREIGN PATENT DOCUMENTS

| | | |
|---|---|---|
| FR | 2556929 | 6/1985 |
| WO | WO2006112802 | 10/2006 |

* cited by examiner

*Primary Examiner* — Monica Williams
(74) *Attorney, Agent, or Firm* — Fitch, Even, Tabin & Flannery, LLP

(57) ABSTRACT

A root watering system has a porous body and an end assembly connected to the porous body. The end assembly has a fluid emitter and integrally defines an inlet passage for directing fluid to the fluid emitter for providing fluid to the porous body. The assembly also may be fitted with an integral valve.

19 Claims, 4 Drawing Sheets

ROOT WATERING SYSTEM AND METHOD THEREFOR

FIELD OF THE INVENTION

The invention relates to a watering device, and in particular, a watering device for providing water below ground or grade level to water roots of plants or trees.

BACKGROUND OF THE INVENTION

Underground root watering systems are used to water the roots of plants and trees especially when water from above ground does not sufficiently seep into the ground. Inadequate water penetration is typically due to hard, ground conditions, such as hard soil composite areas and paved urban areas, or climate conditions that do not produce sufficient precipitation and that cause rapid evaporation.

Root watering systems have a network of water supply piping placed at or below ground level. One or more root watering units may be placed in the vicinity of each plant and connected to the supply piping. The conventional root watering unit has a porous cylinder with an end cap. The cylinder is buried in the ground such that the cap is on grade level or is buried just below grade level. A hook-up conduit extends laterally through a hole in the porous cylinder to attach to the supply piping. The hook-up conduit connects to an interior conduit (whether straight or elbow shaped) extending longitudinally through the cylinder toward the cap.

In one known form, a check valve used to prevent damage due to water hammer, and a filter are placed within the interior conduit. The outlet end of the interior conduit connects to a fluid emitter, which in turn, is held by supporting structure on the cap. In another form, a separate valve piece is connected to the outlet end of the interior conduit and within the cylinder. A filter is placed within the outlet end of the valve piece, while the fluid emitter is connected to the outlet end of the valve piece and secures the valve piece to the cap.

These conventional root watering units are relatively difficult to assemble, especially in the field, due to their many separate pieces. They also are difficult to assemble because the check valve and other parts connected to the fluid line are positioned within the porous cylinder. To assemble the unit, the interior conduit is aligned with the hole on the sidewall of the porous cylinder and then connected to the hook-up conduit extending through the hole. This conduit joint is within the cylinder. The valve and other parts are then assembled to the interior conduit before the cap can be placed on the cylinder. This process also involves the installer matching the length of the interior conduit with the distance from the valve piece or cap to the hole on the cylinder for receiving the hook-up conduit. These steps all result in a relatively cumbersome and labor intensive process. Due to this design, routine maintenance is very time consuming with these known root watering units. For example, the units are removed from the ground in order to clean or adjust the check valve. This is because the valve is not easily accessible by just simply removing the end cap from the cylinder. Thus, there is a desire for a root watering unit that addresses these shortcomings.

DETAILED DESCRIPTION OF THE PREFERRED EMBODIMENTS

Figure 1:
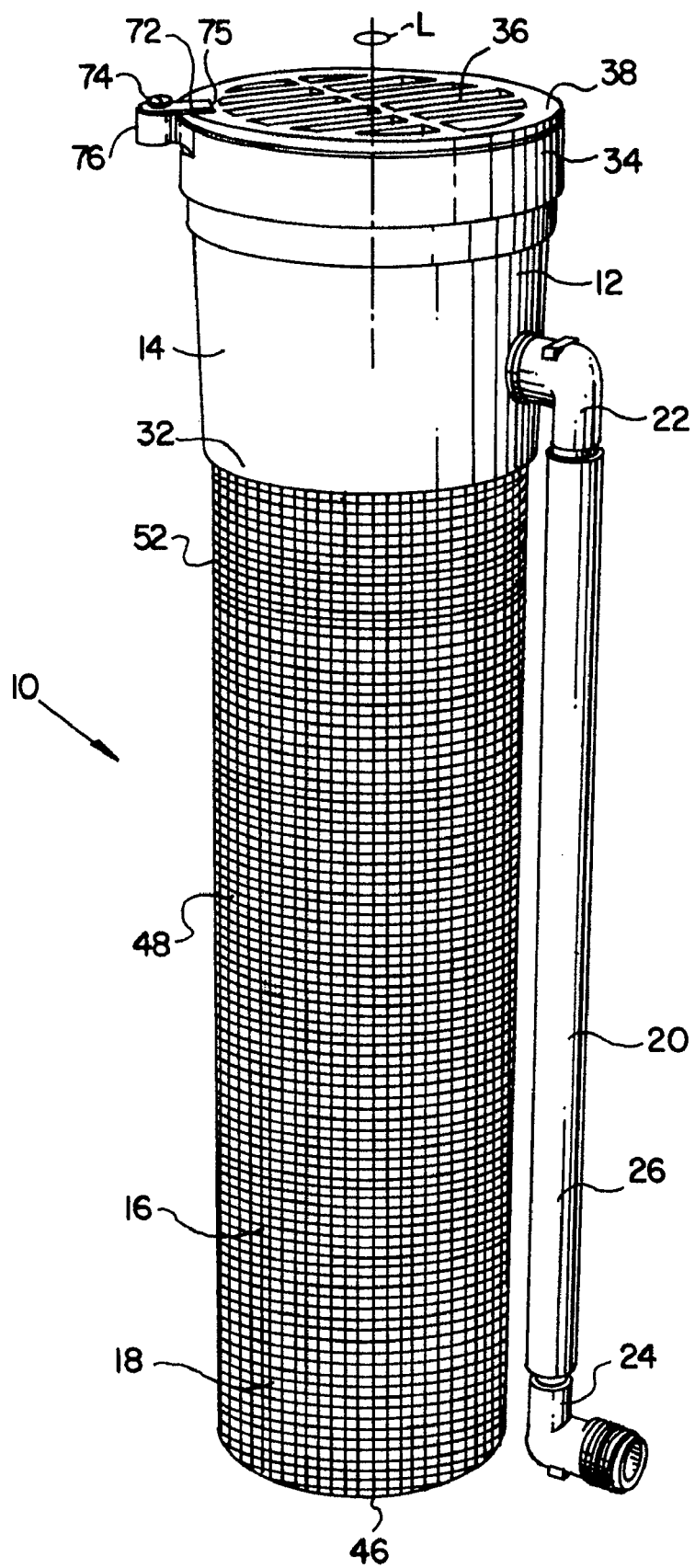
FIG. 1 is a side perspective view of a root watering device embodying aspects of the present invention.
Figure 2:
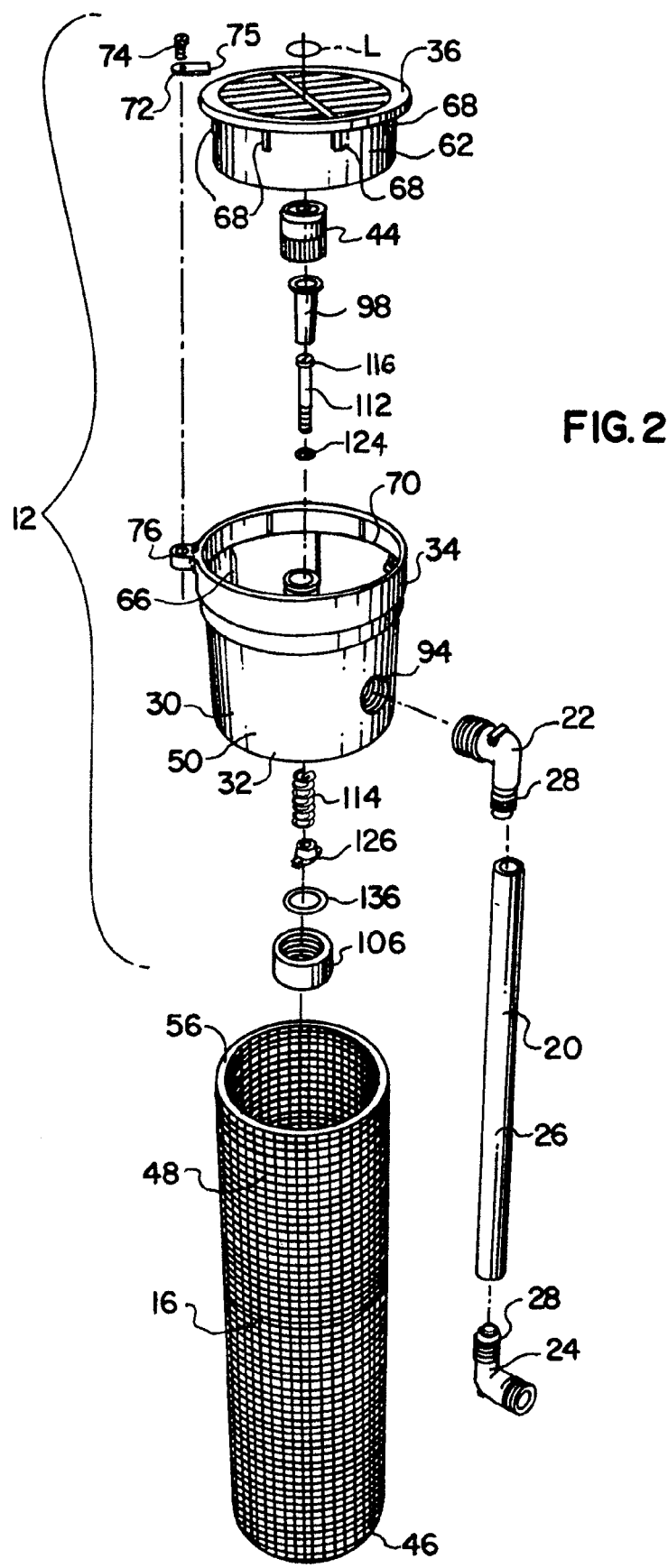
FIG. 2 is an exploded perspective view of the root watering device of FIG. 1.

Referring to FIGS. 1-2, a root watering system or device 10 has an end assembly 12 on an upper end portion 14 of the system 10. The end assembly 12 is connected to a cylindrical porous body 16 that forms a lower end portion 18 of the watering device 10. The watering device 10 provides water to a sub-surface layer of soil for allowing water delivery to roots of plants and trees. For this purpose, the watering device 10 is embedded or otherwise sunk into the ground proximate to the roots with the upper end portion 14 generally at or just below the ground surface or grade level. Because of the length of the device 10, and the device 10 being embedded in the soil, water is able to reach a depth greater than surface watering. The water also is not as readily susceptible to evaporation as when deposited on the surface for watering.

The watering device 10 is typically part of an irrigation system including a plurality of devices 10, where each plant or tree may be provided with one or more watering devices 10. A network of water distribution piping deliver water from a water source to the watering devices. Thus, the watering device 10 has a fluid supply pipe or line 20 that in turn connects to the network of distribution piping. The irrigation system preferably includes a control system for activating or deactivating the system.

In this embodiment, the fluid supply pipe 20 has an upper elbow 22 threaded to the end assembly 12, a lower elbow 24 for connection to a distribution pipe, and a flexible tube 26 attached to barbs 28 on the upper and lower elbows 22 and 24. Often, the distribution pipes are embedded in the ground before the watering devices 10 are placed into the ground or soil. It is very efficient to connect the upper elbow 22 to the end assembly 12 and the lower elbow 24 to the distribution pipe before the watering device 10 is placed in the ground. Once the watering device 10 is in the ground, the flexible tube 26 is connected to the two elbows 22 and 24 to complete the fluid supply line.

Referring to FIGS. 1-5, the end assembly 12 has a housing 30 with an open lower end 32 to provide fluid to the porous body 16 and an upper end 34 covered by a cap or grate 36 that has openings to allow fluid to bubble out and over the top 38 of the watering device 10 or to receive water from the ground surface. The housing 30 also defines an inlet passage 40 that receives fluid from the fluid supply pipe 20, an optional valve 42 fluidly connected to the inlet passage 40, and a fluid emitter 44, such as, for example, a bubbler that emits fluid to the housing which then flows down through the housing, and into the porous body 16. From the porous body 16, the fluid flows out one or both of the bottom end 46 of the porous body or through openings on a cylindrical mesh sidewall 48 forming the porous body 16. While in one embodiment the porous body 16 is kept empty of any soil or granular substances, alternatively the porous body 16 may be at least partially filled with a permeable material such as, for example, coarse gravel.

More specifically, the housing 30 has a cylindrical outer wall 50, although many other shapes are contemplated, such as, for example, non-cylindrical, polygonal, oval, elliptical, or any other irregular shape. The housing 30 and the porous body 16 generally define a longitudinal axis L and both the mesh sidewall 48 of the porous body and the outer wall 50 of the housing 30 generally extend around and generally parallel to the axis L in one form, and generally and cooperatively define an outer side surface 52 of the watering device 10. In this embodiment, the outer wall 50 has a length sufficient to completely envelope cover the sides of the valve 42 and the fluid emitter 44.

At the lower end 32 of the housing 30, the outer wall 50 cooperates with an inner skirt 90 to define an annular groove 54 that opens in the longitudinal direction downwardly to receive an upper rim portion 56 of the porous body 16. The outer wall 50 has circumferentially spaced and interiorly extending, hook or barb-shaped projections 58 (seen best in FIG. 4) for releasably engaging openings on the mesh sidewall 48 of the porous body 16, as shown in FIG. 5. The barbs 58 are shaped to facilitate insertion of the upper rim portion 56 into the groove 54, but resist removal of the upper rim portion 56 from the groove 54. Both the end assembly 12 and the porous body 16 may be made of polymers shaped by injection molding and that may permit sufficient flexibility to facilitate a simple snap-fit connection between the end assembly 12 and the porous body 16 using the projections 58.

At the upper end 34 of the housing 30, the cap 36 sits on an upper rim 60 of the housing 30 and has a longitudinally extending, cylindrical skirt 62 that is received within the outer wall 50 of the housing 30. The outer wall 50 has an interior surface 64 facing the cap skirt 62 when assembled and has interiorly extending and circumferentially spaced fins or braces 66 for engaging the cap skirt 62 with a snug friction fit. The cap 36 also includes a series of has protrusions 68 (shown best in FIG. 2) extending radially outward from the skirt 62 to seat on an annular ledge 70 formed on the interior surface 64 of the outer wall 50.

The cap 36 is otherwise releasably secured to the housing 30 by a latch 72 fastened by a screw 74 to a tab projection 76 that extends radially outward from the upper rim 60. A free end 75 of the latch 72 extends over the cap 36 to retain the cap on the upper rim 60. It will be appreciated, however, that many other ways may be used to releasably secure the cap 36 to the housing 30 as long as soil, debris, or normal water pressure for such root watering devices cannot unintentionally remove the cap 36 from the housing 30.

Figure 3:
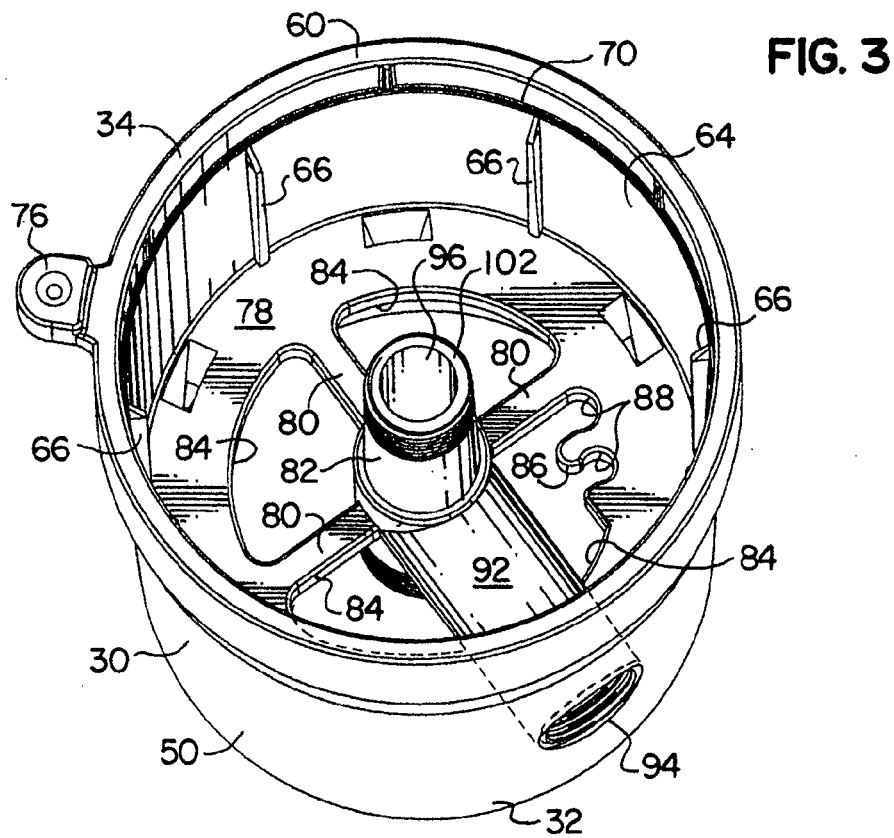
FIG. 3 is an upper perspective view of an end assembly of the root watering device of FIG. 1.
Figure 4:
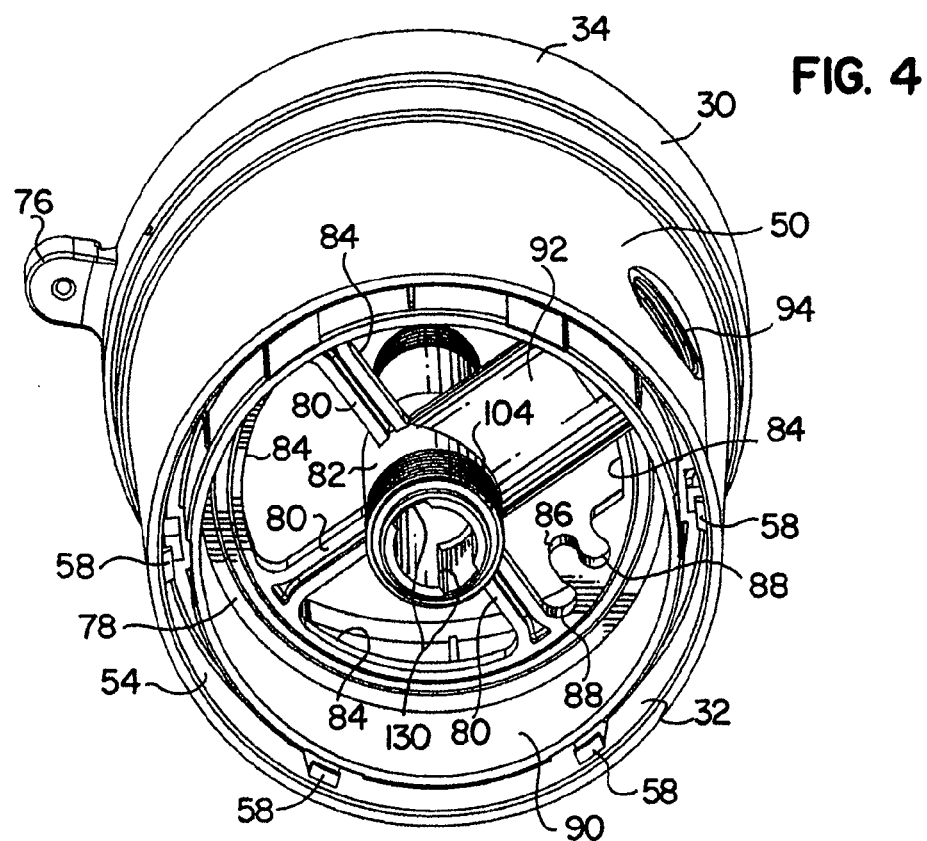
FIG. 4 is a lower perspective view of the end assembly of the root watering device of FIG. 1.
Figure 5:
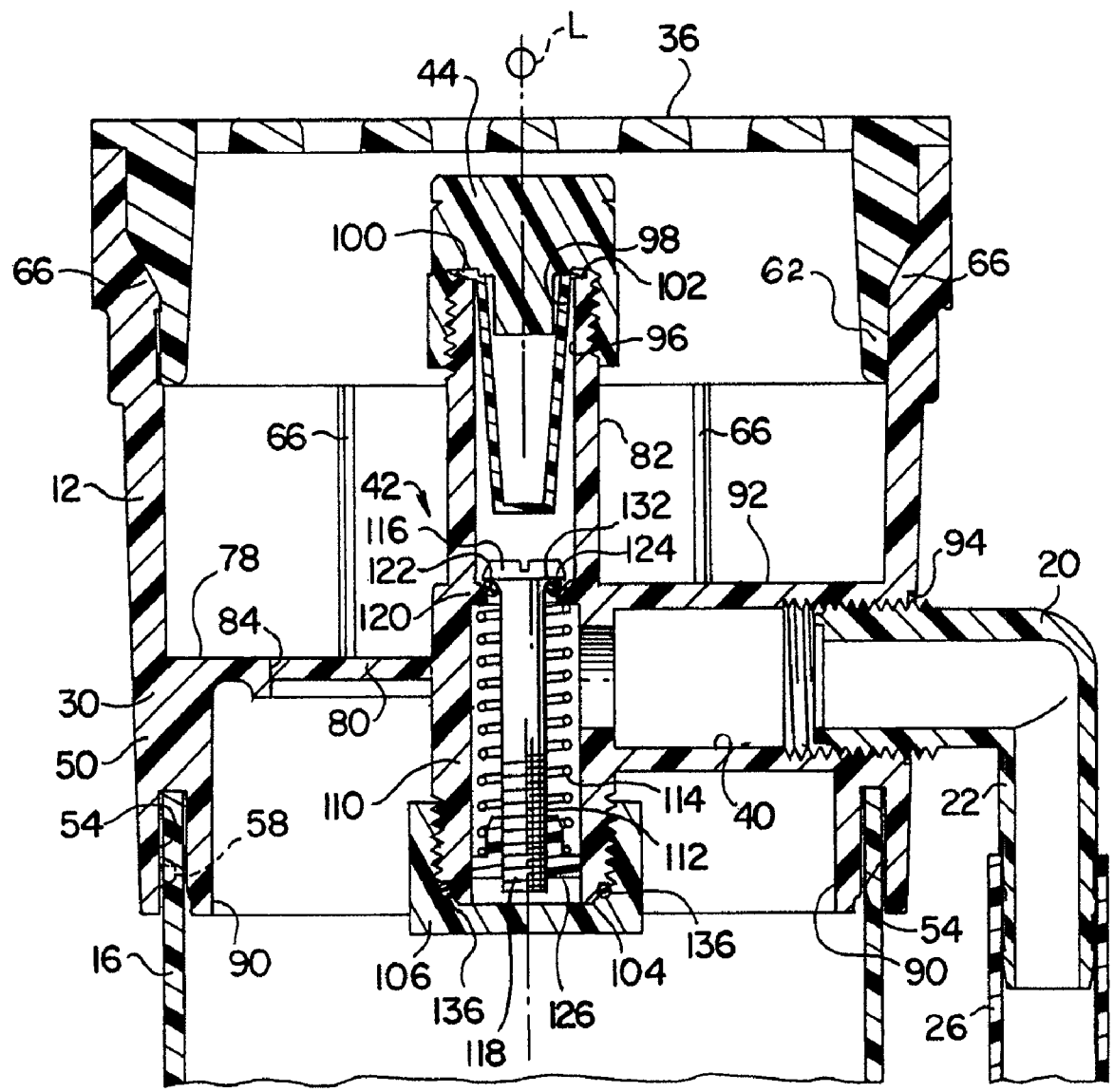
FIG. 5 is a fragmentary, side cross-sectional view of the root watering system of FIG. 1.

Referring to FIGS. 3-5, the housing 30 has an integrally formed, annular shelf 78 that extends radially inward from the interior surface 64 of the outer wall 50. A plurality of support spokes 80 extend radially inward from the shelf 78. The spokes 80 are integrally formed with, and terminate at, a generally coaxial and longitudinally extending central hub 82 that supports the fluid emitter 44. The spokes 80 are generally uniformly and circumferentially spaced about longitudinal axis L and are separated from each other by arcuate spaces 84. The spaces 84 permit substantially unobstructed fluid flow from near the upper end 34 of the housing 30, down to the lower end 32 of the housing 30, and into the porous body 16. At least one of the spaces 84 is lined with a finger 86 forming indents 88 for receiving and holding alternative watering devices such as thin water supply tube that may extend through the lower or upper ends 32 and 34 of the housing 30.

In this embodiment, three spokes 80 are spaced generally 90 degrees apart. In between two of the spokes 80, and generally 90 degrees from each spoke of the two spokes, the housing 30 integrally defines the inlet passage 40 which extends transversely or laterally relative to axis L. The inlet passage 40 interconnects the hub 82 and the outer wall 50. The hub 82 and the inlet passage 40 intersect to form a T-shape. The inlet passage 40 is formed by a cylindrical wall 92 and has an opening 94 at the outer wall 50 for connection to the fluid supply pipe 20.

The fluid emitter 44 is threaded to an upper threaded portion 96 of the hub 82 and over a filter 98 that extends into the hub 82. The filter 98 has a lip 100 clamped between an upper rim 102 of the hub 82 and the fluid emitter 44 for securing the filter 98 in the hub 82. The lower threaded portion 104 of the hub 82 is enclosed by a threaded cap 106 with an O-ring 136 between the cap and the lower portion 104 of the hub 82 to seal the lower portion 104. With this configuration, the inlet passage 40 directs fluid from the supply pipe 20 and into the hub 82. The fluid then flows up through the filter 98 and into the fluid emitter 44.

As an option, the end assembly 12 may include the valve 42 to protect the fluid emitter 44 or other parts from damage commonly caused by water hammer. The hub 82 forms an outer, cylindrical wall 110 for the valve 42 so that the valve 42 is at least partially integrally formed by the end assembly 12. The valve 42 also has an elongate member or piston 112 longitudinally disposed within the wall 110 and that is biased to a closed position (as shown in FIG. 5) by a spring 114. In one form, the piston 112 is a threaded screw like component with a widened head 116 and threaded end 118 opposite the head. The wall 110 has an integrally formed and interiorly extending, annular flange 120 that forms a valve seat 122 that is engaged by an O-ring 124. The O-ring 124 is mounted on the piston 112 underneath the head 116 (or within an annular groove 132 defined by the head) and above the seat 122 so that the bias of the spring 114 causes the head 116 to press the O-ring 124 downward against the seat 122 to close the valve 42.

To bias the valve 42 closed, the spring 114 is compressed between the flange 120 and a retaining nut 126 that is threaded onto the threaded end 118 of the piston 112 and that moves longitudinally with the piston 112. The retaining nut 126 has oppositely extending wings 128 that when assembled are disposed within longitudinally extending, opposite grooves 130 (shown on FIG. 4). The grooves 130 are defined at the cylindrical wall 110 of hub 82 to rotationally fix the retaining nut 126 while providing sufficient clearance for the retaining nut to move longitudinally with the piston 112.

So configured, fluid received from the inlet passage 40 enters the hub 82 and presses upward against the O-ring 124 and upward from beneath the retaining nut 126 in an area between the retaining nut 126 and the cap 106. Once sufficient fluid pressure is present to overcome the bias force of the spring 114, the O-ring 124 and the piston head 116 are lifted upward and off of the valve seat 122, which compresses the spring 114 and opens the valve 42. Fluid is then allowed to flow through to the fluid emitter 44. Once fluid pressure is reduced below a certain predetermined threshold, the O-ring 124 and the piston head 116 fall back down against the seat 122 to reclose the valve 42. This prevents backflow into the water supply piping. Accordingly, foreign matter is not able to be pulled back into the water supply piping.

In operation, water flows through the network of distribution piping, through the fluid supply pipe 20, and into the integral inlet passage 40 of the end assembly 12. The water then enters the hub 82. If the valve 42 is present, the hub 82 fills until sufficient fluid pressure in the hub 82 opens the valve 42 by forcing the piston 112 off of the seat 122. Water then flows through filter 98, and flows out of the fluid emitter 44. The water then either passes out of the watering device 10 through the cap 36 or flows through the housing 30 and into the porous body 16. Water in the porous body 16 then either flows out of the bottom end 46 of the porous body 16 or through the mesh sidewall 48 of the porous body 16 where it is deposited in the vicinity of plant roots. When water flow is reduced, the lack of fluid pressure causes the valve 42 to close.

Since the valve 42 is directly integrated into the end assembly 12 and the inlet passage 40 is integrally defined by the end assembly 12 for receiving fluid for the watering device 10, the end assembly 12 can be completely assembled, including placing the valve biasing member or piston 112 in the conduit or hub 82, before connecting the end assembly 12 to the porous body 16. Then, the completed end assembly 12 can be mounted on the porous body 16 anywhere or at any time whether in the field, while the porous body 16 is already in the ground, or in a manufacturing plant.

This also results in easier disassembly of the watering device 10. Since the fluid supply conduit 20 is connected to the inlet passage 40 for providing fluid to the end assembly 12, the fluid supply line 20 extends entirely exteriorly of the porous body without extending through the porous body. This permits the end assembly 12 or housing 30 to be disconnected from the porous body 16 without the need for digging out the entire device 10 and disconnecting conduits at a conduit joint within the porous body 16. Thus, the end assembly 12 can be easily removed from the porous body 16 to repair, adjust, replace, or clean the end assembly 12, even while the porous body 16 is still in the ground.

For adjustment of the valve 42, the piston head 116 also has a screw head (slotted, Phillips, or otherwise) so that it can be adjusted by a corresponding configured tool without removing the piston 112 from the end assembly 12. This is accomplished by removing the latch 72 from the cap 36, removing the cap 36, and then removing the fluid emitter 44 and filter 98 from the conduit or hub 82 to obtain access to the piston head 116. A tool, such as a screw driver, can then be inserted through the upper end 34 of the housing 30 and into hub 82 to engage the head 116. Turning the head 116, in one example, will change the amount spring 114 is compressed which in turn changes the amount of fluid pressure that is needed to open the valve 42. Further turning of the piston 112 will disengage the retaining nut 126 from the piston 112 so that the piston can be entirely removed from the end assembly 12. This adjustment or removal can be preformed whether or not the end assembly 12 is connected to the porous body 16 and whether or not the end assembly 12 is in the ground. If the end assembly 12 is in the ground, soil just directly above the watering device 10 needs to be removed for access to the inside of the watering device and the valve biasing member 112.

The reduction in parts due to the integrally formed conduits 82 and 40 and valve 42 on the end assembly 12 as well as the direct connection of the inlet passage 40 to the fluid supply line 20 resulting in a simplified assembly of the watering device 10 which provides a significant reduction in costs due to reduced parts and labor.

While the invention has been described with respect to specific examples including presently preferred modes of carrying out the invention, those skilled in the art will appreciate that there are numerous variations and permutations of the above described systems and techniques that fall within the scope of the invention as set forth in the appended claims.

What is claimed is:

1. A root watering system, comprising:
    a porous body; and
    an end assembly having a housing and a fluid emitter supported in the housing, the housing having an endwall and a sidewall surrounding the fluid emitter, the sidewall being at least substantially solid and connected to the porous body, a radially extending hollow spoke rigidly formed with the sidewall of the housing and extending from the emitter through the sidewall and through only the housing for receiving fluid from a source external of the root watering system and directing the fluid to the fluid emitter for providing fluid to the porous body;
    wherein the hollow spoke terminates with a hollow hub that extends along the longitudinal axis of the housing, and wherein the hollow spoke is fluidly connected to the hollow hub.

2. The root watering system of claim 1, wherein the hollow spoke and the hollow hub form a T connection in the housing.

3. The root watering system of claim 1, further comprising a valve formed within the hollow hub.

4. The root watering system of claim 3, wherein the hollow hub has a wall defining a seat for the valve, and wherein the valve has a biased member disposed within the hollow hub to releasably engage the seat for closing and opening the valve to control fluid flow to the fluid emitter.

5. The root watering system of claim 4, wherein the biased member is configured and disposed to be adjusted without removing the end assembly from the porous body.

6. The root watering system of claim 3, wherein the valve is configured and disposed to be accessible for adjustment of the fluid pressure needed to open the valve by removing the end wall and the fluid emitter from the end assembly and without removing the valve from the hollow hub.

7. The root watering system of claim 1, further comprising a supply conduit connected to the hollow spoke for providing fluid to the end assembly, the supply conduit extending on the exterior of the end assembly and without extending through the porous body.

8. A root irrigation system comprising:
    a porous body having a mesh outer wall;
    a fluid emitter; and
    an end assembly having an entirely non-mesh housing defining a cavity and connected to the porous body, the end assembly including a hollow hub for supporting the fluid emitter in the cavity and at least one radial spoke supporting the hub in the cavity, the at least one radial spoke being hollow to define a fluid engaging inlet passage generally radially extending inside the at least one radial spoke and for receiving fluid external to the root watering system from a supply conduit, the fluid engaging inlet passage directing fluid through the spoke to the fluid emitter to provide fluid to the cavity about the hub and to the porous body;
    wherein the at least one radial spoke terminates with the hub that extends along the longitudinal axis of the housing, and wherein the at least one radial spoke is fluidly connected to the hub.

9. The root watering system of claim 8 wherein the hub defines a fluid engaging chamber along a longitudinal axis of the root watering system.

10. The root watering system of claim 9 wherein the fluid engaging chamber has a first portion and a second portion, the fluid emitter is supported on the hub at a terminal end of the first portion of the fluid engaging, chamber to receive water for emission into the end assembly about the hub.

11. The root watering system of claim 10 wherein the fluid engaging inlet passage communicates with the second portion of the fluid engaging chamber, and wherein the second portion of the fluid engaging chamber houses a valve that controls water flow to the first portion of the fluid engaging chamber from the second portion of the fluid engaging chamber.

12. The root watering system of claim 11 wherein a valve seat is located at a transition between the first portion and the second portion of the fluid engaging chamber.

13. The root watering system of claim 12 wherein the valve includes a valve shaft extending from the second portion into the first portion of the fluid engaging chamber and a valve head supported by the valve shaft in the first portion of the fluid engaging chamber.

14. The root watering system of claim 13 wherein the valve head is biased toward the valve seat.

15. The root watering system of claim 14 further comprising a seal disposed between the valve head and the valve seat.

16. The root watering system of claim 14 wherein the spring is adjusted to increase or decrease bias of the spring to alter flow characteristics to the fluid emitter.

17. The root watering system of claim 16 wherein the first portion of the fluid engaging chamber houses a filter.

18. The root watering system of claim 17 wherein the fluid emitter includes a releasable connection to the terminal end of the first portion of the fluid engaging chamber to provide access to remove the filter for maintenance or to increase or decrease the bias of the spring.

19. The root watering system of claim 8 wherein the hub and the at least one radial spoke are integrally formed with one another.

* * * * *